(12) United States Patent
Stanek

(10) Patent No.: US 6,571,549 B1
(45) Date of Patent: Jun. 3, 2003

(54) JET NOISE SUPPRESSOR

(75) Inventor: Michael J. Stanek, Springboro, OH (US)

(73) Assignee: The United States of America as represented by the Secretary of the Air Force, Washington, DC (US)

(*) Notice: Subject to any disclaimer, the term of this patent is extended or adjusted under 35 U.S.C. 154(b) by 5 days.

(21) Appl. No.: 09/973,176

(22) Filed: Oct. 5, 2001

(51) Int. Cl.⁷ .................................................. F02K 1/34
(52) U.S. Cl. ...................... 60/262; 60/264; 239/265.19; 181/213; 181/220
(58) Field of Search ........................... 60/231, 247, 248, 60/262, 264; 239/265.19, 265.23, 265.17; 181/213, 220

(56) References Cited

U.S. PATENT DOCUMENTS

| | | | |
|---|---|---|---|
| 3,143,856 A | * 8/1964 | Hausmann | 239/265.17 |
| 3,282,051 A | * 11/1966 | Unfried | 60/230 |
| 3,599,749 A | * 8/1971 | Millman | 181/220 |
| 3,982,696 A | 9/1976 | Gordon | |
| 4,018,384 A | * 4/1977 | Fitzgerald et al. | 239/265.19 |
| 4,280,587 A | 7/1981 | Bhat | |
| 5,092,425 A | * 3/1992 | Shaw, Jr. | 181/213 |
| 5,297,501 A | * 3/1994 | Lieberman et al. | 116/137 A |
| 5,884,472 A | 3/1999 | Presz, Jr. | |
| 6,375,118 B1 | * 4/2002 | Kibens et al. | 244/53 R |
| 6,446,904 B1 | * 9/2002 | Stanek | 244/1 N |

OTHER PUBLICATIONS

Michael J. Stanek, Copending, Commonly Assigned Patent Application: "High Frequency Pulsed Fuel Injector", AFD 00436, Filed on Even Date.

Michael J. Stanek, Copending Commonly Assigned Patent Application: "Aircraft Weapons Bay High Frequency Acoustic Suppression Apparatus", AFD 00439, Filed on Even Date.

Brocher et al., "Fluid Dynamics of the Resonance Tube" Journal of Fluid Mechanics vol. 43, Part 2 pp. 369–384 (1970).

* cited by examiner

Primary Examiner—Ted Kim
(74) Attorney, Agent, or Firm—Richard A. Lambert; Bobby D. Scearce; Thomas L. Kundert

(57) ABSTRACT

A jet noise suppressor is disclosed. The jet noise suppressor includes first and second high frequency pulse injection units located exteriorly of the turbine engine exhaust nozzle. The pulse injection units are located oppositely, diametrically across the exhaust nozzle. The pulse injection units include a resonance tube in outlet fluid communication with an injector nozzle. High pressure gas is supplied to the resonance tubes. A second source of high pressure gas includes a switch for supplying an alternating flow of high pressure gas to the injector nozzles. The combination of the high frequency pulses emitted from the injection units with the alternating low frequency, high amplitude mode of injection across the exhaust nozzle, provides a dramatic reduction of noise as well as exhaust temperature.

14 Claims, 4 Drawing Sheets

JET NOISE SUPPRESSOR

RIGHTS OF THE GOVERNMENT

The invention described herein may be manufactured and used by or for the Government of the United States for all governmental purposes without the payment of any royalty.

BACKGROUND OF THE INVENTION

The present invention relates generally to gas turbine engines and more specifically to an apparatus for injecting high frequency perturbations into the flow of jet engine exhaust gasses to provide noise suppression and temperature reduction.

This application is somewhat related to my copending and commonly assigned patent applications "HIGH FREQUENCY PULSED FUEL INJECTOR", AFD 00436, Serial Number 09/973,161 and "AIRCRAFT WEAPONS BAY HIGH FREQUENCY ACOUSTIC SUPPRESSION APPARATUS", AFD 00439, Serial Number 09/973,175, now U.S. Pat. No. 6,446,904 filed on even date herewith. The contents of these even filing date applications are hereby incorporated by reference herein.

A serious problem associated with the use of jet engines in aircraft and other applications such as stationary power generation is the propensity of the jet engine to generate high levels of noise. The noise levels generated by jet aircraft can be great enough to cause fatigue of structural members and in general create noise pollution problems in populated areas near airports. Moreover, the intense levels of noise generated create hazardous conditions for personnel working near operating jet engines. Not only is noise generation a problem, but the enormous heat expelled by the engine presents a problem for airport personnel working nearby as well.

Numerous approaches have been made to date in order to suppress jet engine noise. Representative of one of these approaches is U.S. Pat. No. 5,884,472 to Presz Jr. et al which discloses a ring of inwardly projecting lobes or projections mounted within the exhaust nozzle/tailpipe. The intent of devices such as these is to create mixing within the flow of exhaust gasses by the provision of the lobes. Another approach is found in U.S. Pat. No. 3,982,696 to Gordon disclosing a noise suppressor nozzle including several chutes for directing a flow of air into the stream of exhaust gasses at the boundary layer. Another approach similar to Gordon's is found in U.S. Pat. No. 4,280,587 to Bhat disclosing the use of lobes, tubes or deflectors within the exhaust nozzle to promote mixing of ambient air within the flow of exhaust gasses. While each of these approaches have met with some degree of success, each presents the disadvantage of imparting a reduction in the cross sectional area of the exhaust flow, partially blocking the exhaust flow. Another disadvantage lies in the fact that these lobes and deflectors must be fabricated from very expensive, high temperature resistant materials.

A need exists therefore for an improved jet noise suppressor. Such a suppressor would exhibit improved noise suppression characteristics enhancing aircraft operation without impeding engine operation.

SUMMARY OF THE INVENTION

Accordingly, it is a primary object of the present invention to provide a jet noise suppressor overcoming the limitations and disadvantages of the prior art.

It is yet another object of the present invention to provide a jet noise suppressor that is self actuating and contains no moving parts.

Another object of the present invention is to provide jet noise suppressor providing noise reduction over a wide range of aircraft operating conditions.

It is yet another object of the present invention to provide a jet noise suppressor that can be utilized on a wide variety of aircraft.

It is still another object of the present invention to provide a jet noise suppressor that reduces exhaust gas temperature.

Still another object of the present invention is to provide a jet noise suppressor that includes first and second pulse injection units for providing high frequency perturbation of the exhaust gasses as well as a second, lower frequency periodic perturbation.

These and other objects of the invention will become apparent as the description of the representative embodiments proceeds.

In accordance with the foregoing principles and objects of the invention, a jet noise suppressor is provided to effectively suppress the exhaust noise that emanates from a gas turbine engine during operation. The jet noise suppressor of the present invention has particular utility in aircraft applications where effective noise suppression is particularly desirable.

The jet noise suppressor of the present invention includes a pair of high frequency pulse injection units mounted exteriorly of the exhaust nozzle of the gas turbine engine. Each pulse injection unit has an outlet directed such that it discharges into the boundary of the flow of exhaust gasses from the turbine engine during operation. The pulse injection units are located oppositely from one another, diametrically across the exhaust nozzle.

Each pulse injection unit includes a resonance tube placed in outlet fluid communication with an injector nozzle. The outlet of the injector nozzle is directed into the flow of exhaust gasses as described above.

The jet noise suppressor includes a pair of high pressure gas sources, each of which can be an air compressor or an engine compressor discharge port. The high pressure gas generated by the first source is directed through suitable conduit or tubing into each of the resonance tubes. Resonance tubes are known, and in general, are fluidic devices that receive a pressurized fluid input and provide a pulsating fluid output. The nature of the output, such as pulse frequency and amplitude is variable and depends on upon the dimensions of the resonance tube.

As stated, each pulse injection unit includes a resonance tube in outlet fluid communication with an injector nozzle. Each injector nozzle receives high pressure gas from a second source. The pulsating fluid output of the resonance tube, as directed into the injector nozzle perturbs the flow of air therein, effectively breaking it up into discrete slugs or pulses which exit the nozzle and are directed into the exhaust stream. It is believed that this pulsating flow from the injector nozzle destroys large coherent vorticular structures by introducing high levels of small scale mixing.

According to an important aspect of the present invention, the second source of high pressure gas includes a flip-flop type actuator for switching the inlet flow to the injector nozzles alternately between the first and second pulse injection units. This provides for dramatic noise suppression as well as exhaust temperature reduction by introducing a low frequency, high amplitude modulation into the flow of exhaust gas. This has the overall effect of reducing broadband turbulent mixing noise in the exhaust by starving the low frequency disturbances of energy. Moreover, high levels of ambient air are entrained in the exhaust, lowering its temperature.

Advantageously, the jet noise suppressor of the present invention has no moving parts, enhancing reliability as well as reducing costs. The jet noise suppressor, by virtue of its simplicity and autonomous operating capability can be retrofit into a wide variety of aircraft. And, the jet noise suppressor includes no structure to impede the flow of exhaust gasses from the engine.

BRIEF DESCRIPTION OF THE DRAWING

The accompanying drawing incorporated in and forming a part of the specification, illustrates several aspects of the present invention and together with the description serves to explain the principles of the invention. In the drawing.

DETAILED DESCRIPTION OF THE INVENTION

Figure 1:
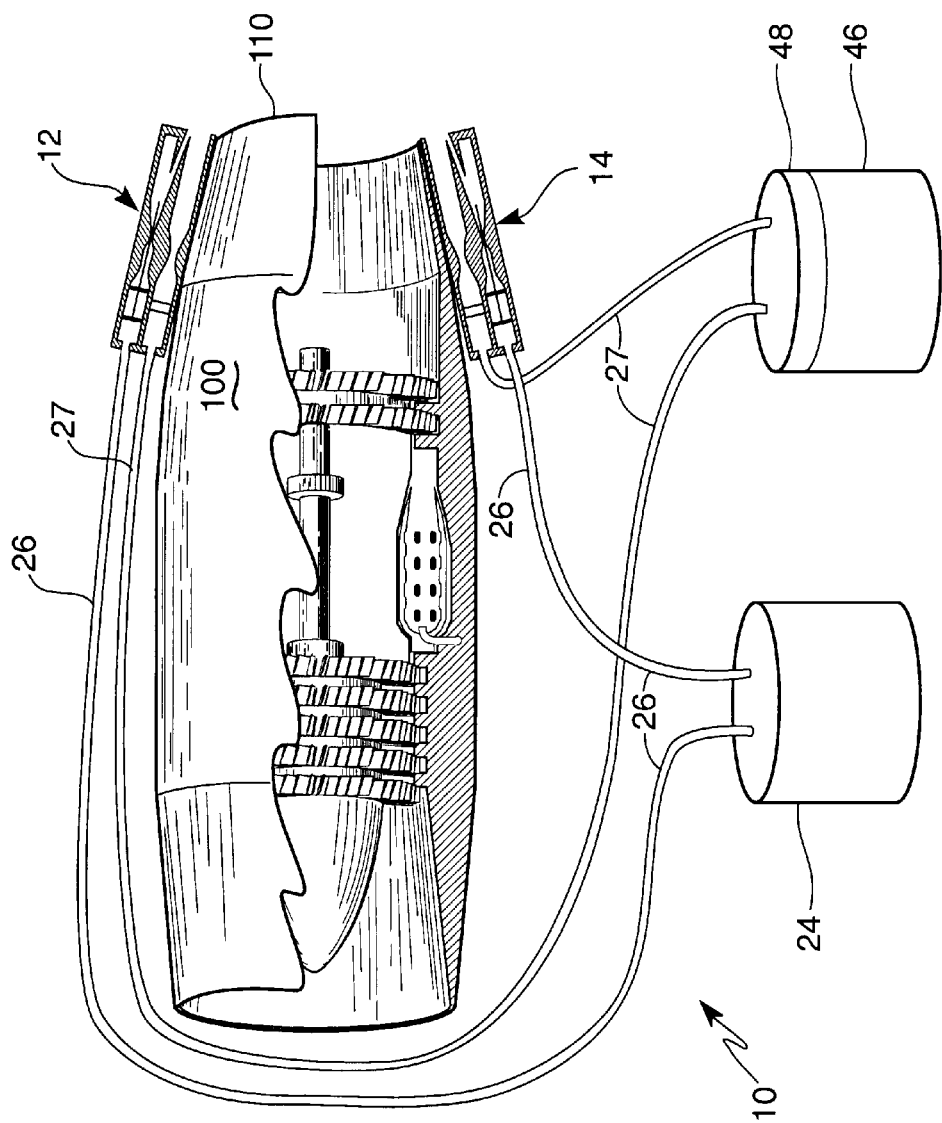
FIG. 1 is a partial cross sectional view of the jet noise suppressor of the present invention shown mounted upon a representational gas turbine engine.

Reference is made to the drawing figures and particularly FIG. 1 showing the jet noise suppressor 10 of the present invention. Gas turbine engines are used in a wide variety of applications and have great utility due to their overall reliability and high power output capabilities. Indeed, the highly developed state of modem aviation, both commercial and military, is predicated on the use of jet engines. While jet engines provide enormous benefits, they also present drawbacks as well. One great drawback is the irritating and sometimes physically destructive noise emitted by jet engines during operation. Another drawback is the enormous heat expelled by jet engines during operation, which can be a serious problem for personnel working nearby.

The noise from a jet engine can be described as the combination of several elements; broadband jet mixing noise, broadband shock noise, and discrete tone jet screech. When an exhaust nozzle is operated at its design Mach number (when the nozzle exit pressure equals ambient) no shocks occur in the exhaust plume, and the only type of noise present is broadband mixing noise generated as a result of turbulence.

When the exhaust nozzle is operated outside of its design parameters, such as frequently occurs in military aircraft applications, shocks and corresponding shock lines appear in the exhaust plume. The boundary layer of the jet exhaust plume, where the flow rapidly changes from a high speed jet to very low or zero speed ambient air, is known as the shear layer. The places where the shock lines in the jet exhaust plume strike the shear layer are known as shock cells and when instability waves generated from the shear layer strike the shock cells, noise is produced. The net result is the generation of broadband shock noise.

When conditions are right, the upstream propagating sound waves from the shock cells actively stimulate the growth of instability waves in the shear layer. At times, the instability growth, newly produced shock cell noise and reflected sound waves all become in phase with each other. This creates a dangerous resonance condition known as jet screech. Jet screech presents an enormous problem because it can cause sonic fatigue failure of aircraft structures with potentially catastrophic results.

Advantageously and as will be described in more detail below, the jet noise suppressor 10 of the present invention operates to quiet all of these components of jet noise, and provide a desirable lowering of exhaust plume temperature as well.

Figure 5:
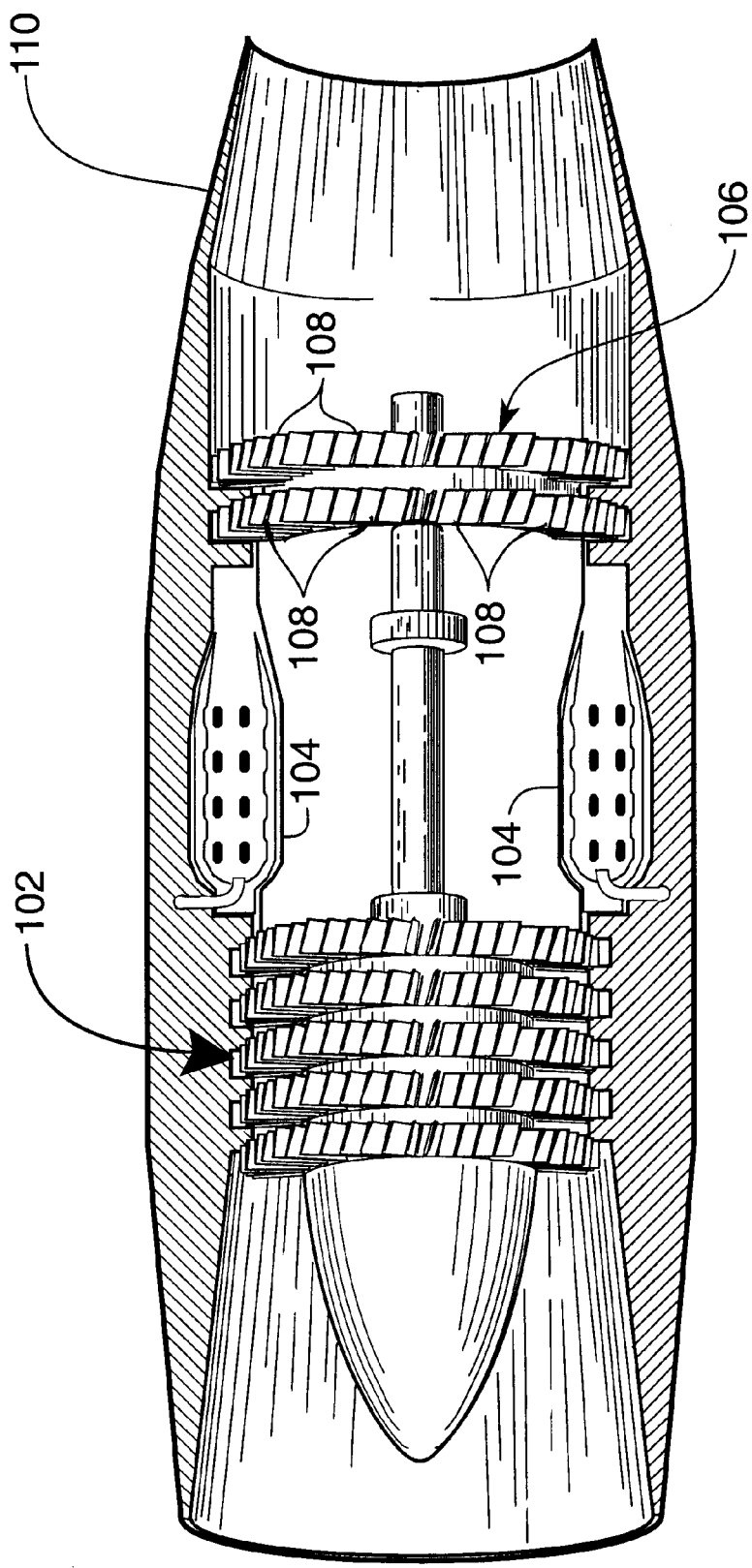
FIG. 5 is a cross sectional view of a representational gas turbine engine.

As is known in the art, in a typical gas turbine engine 100 as shown in FIG. 5, a compressor section 102 receives atmospheric air and pressurizes it prior to admission into the combustion chambers 104 wherein it is ignited and further directed into the turbine section 106. The turbine section 106, powered by the expansion of the combustion gasses acting upon the turbine rotor blades 108, provides the desired thrust as well as the motive force for the compressor section 102. The combustion gasses, after passage through the turbine section 106, exit the engine through an exhaust nozzle 110.

Figure 2:
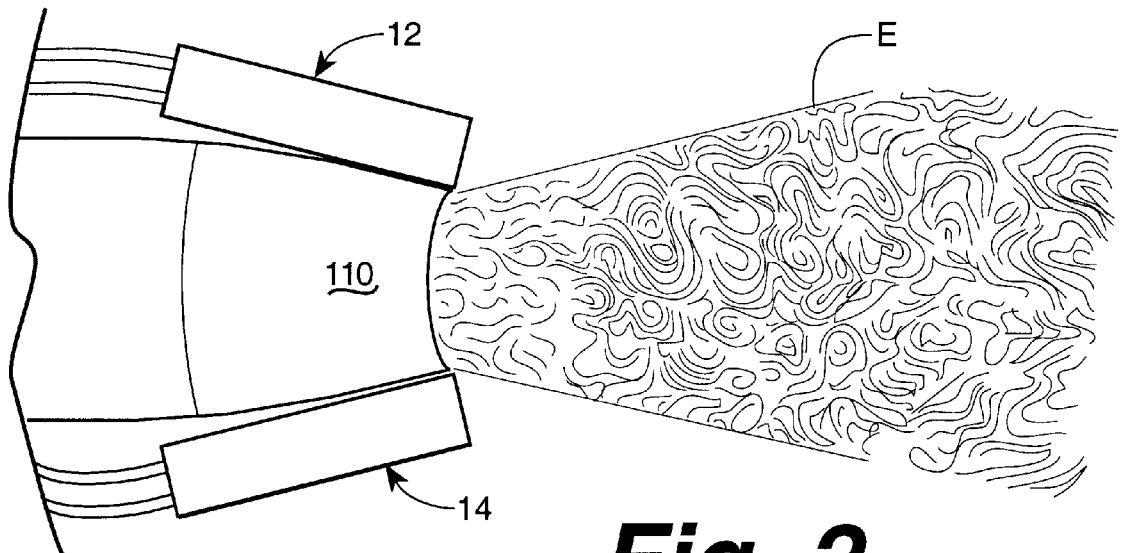
FIG. 2 is a diagrammatic view showing the typical exhaust plume emitted from a typical gas turbine engine.
Figure 3:
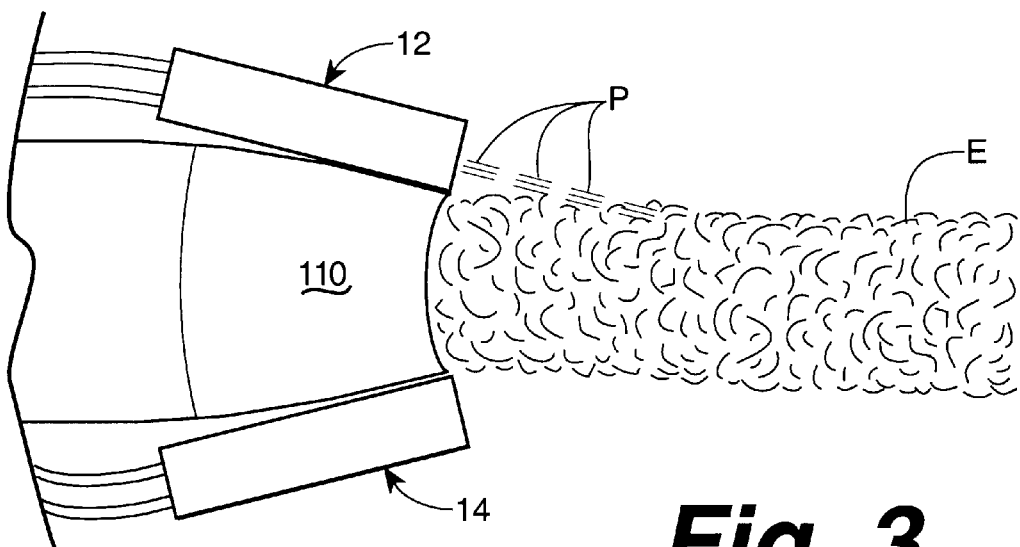
FIG. 3 is a diagrammatic view showing the exhaust plume emitted from a typical gas turbine engine during operation of the jet noise suppressor of the present invention.

Reference is made to FIG. 1 showing the jet noise suppressor 10 of the present invention shown in relation to a representative gas turbine engine 100. The jet noise suppressor 10 includes first and second pulse injection units 12 and 14 respectively located exteriorly of the exhaust nozzle 110. These pulse injection units 12 and 14 operate to inject high frequency pulses of high pressure air into the exhaust plume emitted from the engine during operation. It is believed that these high frequency pulses of high pressure air serve to dramatically enhance small scale mixing within the exhaust plume, destroying undesirable large scale coherent vorticular structures. See, for example the diagrammatic FIGS. 2 and 3 wherein the vorticular structure of the exhaust plume E in FIG. 2 is replaced by a quiet, fine structured exhaust plume E as shown in FIG. 3 when the high frequency pulses P from a pulse injection unit (12 in this Figure) are discharged into the exhaust plume E.

Figure 4:
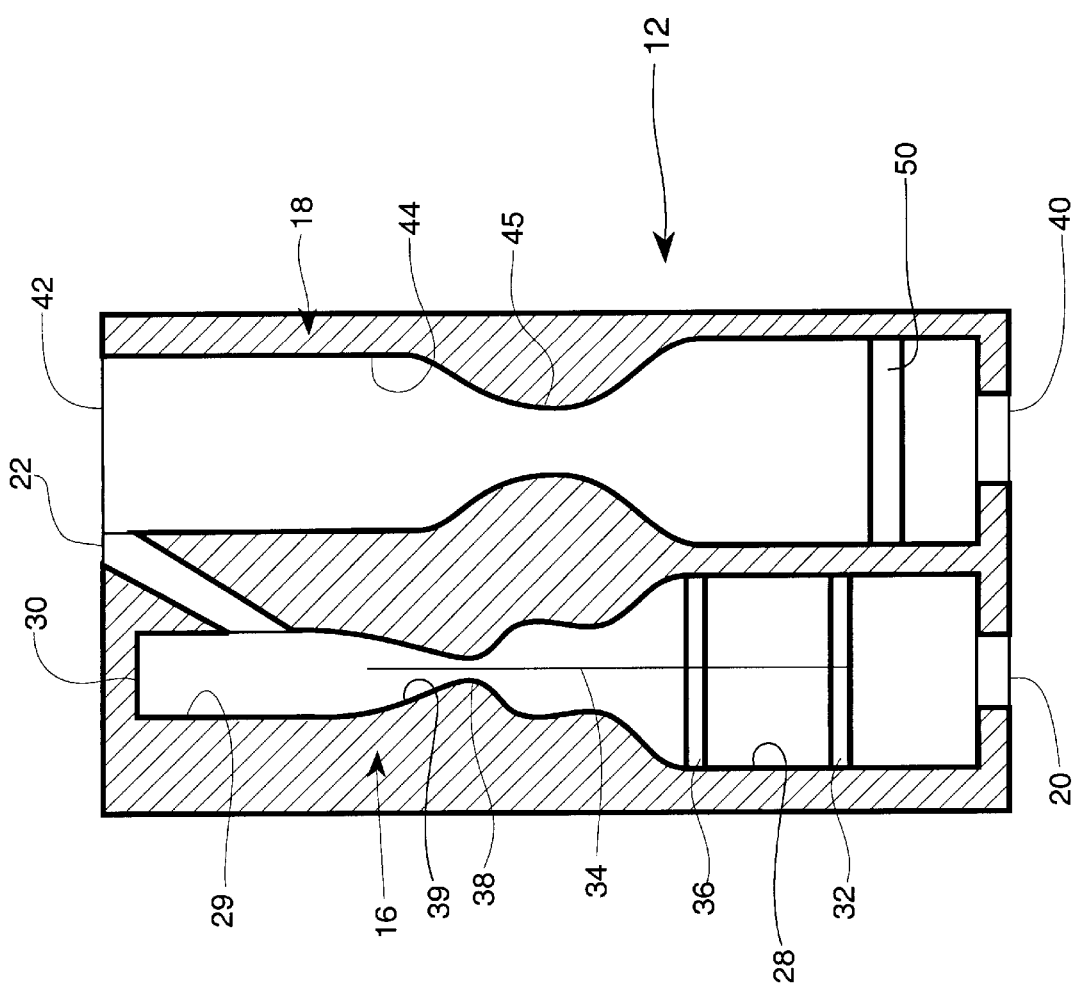
FIG. 4 is a cross sectional view of an pulse injection unit of the jet noise suppressor of the present invention.

Reference is made to FIG. 4, a cross sectional representation of the first pulse injection unit 12. It should be understood that both first and second pulse injection units 12 and 14 have identical structures and that the following description of the first pulse injection unit 12 relates equally to the second injection unit 14. In the preferred embodiment, the pulse injection unit 12 includes a resonance tube 16 in outlet fluid communication with an injector nozzle 18. The operative combination of the resonance tube 16 and the injector nozzle 18 provides the desired high frequency pulsating discharge of high pressure gas.

Resonance tubes are well known in the art. Background material related to resonance tubes which may be helpful in understanding the invention may be found by reference to "Fluid Dynamics of the Resonance Tube", by Brocher et al., J. Fluid Mech. (1970) Vol. 43, Part 2, pp. 369–384, Great Britain, and the references cited therein, the entire teachings of which are incorporated by reference herein. Generally, and as shown in FIGS. 4 and 1, the resonance tube 16 includes an inlet 20 and an outlet port 22. The resonance tube 16 receives pressurized gas from a first source of high pressure gas 24. The first source of high pressure gas 24 can be an air compressor or perhaps a gas turbine compressor discharge port. Suitable conduit or tubing 26 connects the high pressure gas to the inlet 20 of the resonance tube 16. During operation of the resonance tube 16, the gas expands and travels down the bore 28 from the inlet 20 through an internal converging/diverging section 38. The gas exits the internal converging/diverging section 38 via the diverging outlet 39. As the gas travels down the constant diameter section 29 (from the outlet 39 to the end wall 30), it sets up compression waves (not shown). The reflection of the compression wave from the end wall 30, and a subsequent reflected expansion wave (not shown), serve to cause a backward flow from the end wall 30 to the resonance tube outlet port 22. As the compressed gas escaping from the constant diameter section 29 of the resonance tube 16 encounters the gas flowing from the outlet 39 of the internal converging/diverging section 38, an opposition is created, initiating a cyclical pulsed discharge from the resonance tube outlet port 22. Generally, the frequency of this resonance is dependent on the length of the resonance tube 16 and the amplitude of the pulsed discharge depends primarily on the Mach number of the incoming flow.

The resonance tube 16 preferably contains a perforated flow straightener 32 to refine and condition the flow of the pressurized gas. A center rod 34 is provided in order to impart a degree of drag to the air flow in order to slow down a part of the flow. This results in a more pronounced pulsed discharge through the outlet port 22, enhancing operation. A rod support 36 may be utilized, if desired, in order to retain the center rod 34 in the correct position. In the preferred embodiment, the rod support 36, has an "X" cross section to retain the center rod 34 in position while not impeding the air flow within the bore 28. As described above, an internal converging/diverging section 38 is formed within the bore 28. Similar to the resonance tube 16, the injector nozzle 18 includes, an inlet 40, an outlet 42, and an internal nozzle bore 44. An internal converging/diverging section 45 is formed within the bore 44. This has the effect of accelerating the flow to supersonic velocities. As shown in FIG. 1, the high pressure gas is delivered to the inlet 40 via tubing 27 from a second source of high pressure gas 46. The second source of high pressure gas 46 can be an air compressor or a gas turbine compressor discharge port in the same manner as the first source of high pressure gas 24. However, according to a significant aspect of the present invention, and as will be described in more detail below, the second source of high pressure gas 46 also includes a switch 48, which in the preferred embodiment is a commercial fluidic flip-flop actuator, such as available from Honeywell, Tempe, Ariz. The injector nozzle also preferably contains a perforated flow straightener 50 to refine and condition the flow of the pressurized gas.

As stated above, and as shown in FIGS. 1 and 4, the outlet port 22 of the resonance tube 16 is connected directly to the injector nozzle 18. The pulsating output of the resonance tube 16, perturbs the flow of gas within and immediately after exiting the injector nozzle 18, effectively breaking it up into discrete slugs or pulses which enter the exhaust plume E. Concurrently, the switch 48 operates to alternate the flow of pressurized gas between the injector units 12 and 14. In this way, the high frequency pulsed output alternates across the exhaust plume E, providing a high amplitude, low frequency modulation into the flow of exhaust gases. This combination of the high frequency pulses emitted from the injection units 12 and 14 and the alternating low frequency, high amplitude mode of injection created by alternating the operation of the injection units 12 and 14 across the exhaust nozzle 110, provides a dramatic reduction of noise. The high degree of mixing afforded by the low frequency, high amplitude injection also provides for a desirable reduction in exhaust temperature.

In summary, numerous benefits have been described from utilizing the principles of the present invention. The combination of the high frequency pulses emitted from the injection units 12 and 14 with the alternating low frequency, high amplitude mode of injection, across the exhaust nozzle 110 provides a dramatic reduction of noise.

The foregoing description of the preferred embodiment has been presented for purposes of illustration and description. It is not intended to be exhaustive or to limit the invention to the precise form disclosed. Obvious modifications or variations are possible in light of the above teachings. For example, each pulse injection unit 12 and 14 can include several resonance tubes 16 in outlet fluid communication with a corresponding number of injector nozzles 18. In this way, each pulse injection unit 12 and 14 presents a bank of injector nozzles, each directed into the exhaust plume E. Or, in situations where the alternating low frequency, high amplitude mode of injection created by alternating the operation of the injection units 12 and 14 across the exhaust nozzle 110 is not desired to be implemented, the switch 48 can be omitted. The embodiment was chosen and described to provide the best illustration of the principles of the invention and its practical application to thereby enable one of ordinary skill in the art to utilize the inventions in various embodiments and with various modifications as are suited to the particular scope of the invention as determined by the appended claims when interpreted in accordance with the breadth to which they are fairly, legally and equitably entitled.

I claim:

1. An apparatus for suppressing jet noise from a gas turbine engine having an exhaust nozzle for directing a flow of exhaust gasses from the engine, comprising:
   a first pulse injection unit located exteriorly of said nozzle, said first pulse injection unit including a resonance tube in outlet fluid communication with an injector nozzle, said injector nozzle having an outlet directed into the flow of the exhaust gasses;
   a second pulse injection unit located exteriorly of said nozzle and located oppositely, diametrically across the exhaust nozzle from said first pulse injection unit, said second pulse injection unit including a resonance tube in outlet fluid communication with an injector nozzle, said injector nozzle having an outlet directed into the flow of the exhaust gasses;
   a first source of high pressure gas in fluid communication with each of said resonance tubes; and,
   a second source of high pressure gas in fluid communication with each of said injector nozzles, said second source of high pressure gas including a switch for alternating the inlet flow of said high pressure gas between said injector nozzles.

2. The apparatus of claim 1 wherein said first source of high pressure gas is a gas turbine engine compressor bleed port.

3. The apparatus of claim 1 wherein said first source of high pressure gas is an air compressor.

4. The apparatus of claim 1 wherein said second source of high pressure gas is a gas turbine engine compressor bleed port.

5. The apparatus of claim 1 wherein said second source of high pressure gas is an air compressor.

6. The apparatus of claim 1 wherein said switch is a fluidic flip-flop actuator.

7. An apparatus for suppressing jet noise from a gas turbine engine having an exhaust nozzle for directing a flow of exhaust gasses from the engine, comprising:
- a first pulse injection unit located exteriorly of said nozzle, said first pulse injection unit including a plurality of resonance tubes in outlet fluid communication with a corresponding plurality of injector nozzles, each said injector nozzle having an outlet directed into the flow of the exhaust gasses;
- a second pulse injection unit located exteriorly of said nozzle and located oppositely, diametrically across the exhaust nozzle from said first pulse injection unit, said second pulse injection unit including a plurality of resonance tubes in outlet fluid communication with a corresponding plurality of injector nozzles, each said injector nozzle having an outlet directed into the flow of the exhaust gasses;
- a first source of high pressure gas in fluid communication with each of said resonance tubes; and,
- a second source of high pressure gas in fluid communication with each of said plurality of injector nozzles in each of said first and second pulse injection units, said second source of high pressure gas including a switch for alternating the inlet flow of said high pressure gas between said first and second pulse injection units.

8. The apparatus of claim 7 wherein said first source of high pressure gas is a gas turbine engine compressor bleed port.

9. The apparatus of claim 7 wherein said first source of high pressure gas is an air compressor.

10. The apparatus of claim 7 wherein said second source of high pressure gas is a gas turbine engine compressor bleed port.

11. The apparatus of claim 7 wherein said second source of high pressure gas is an air compressor.

12. The apparatus of claim 7 wherein said switch is a fluidic flip-flop actuator.

13. An apparatus for suppressing jet noise from a gas turbine engine having an exhaust nozzle for directing a flow of exhaust gasses from the engine, comprising:
- a first pulse injection unit located exteriorly of said nozzle, said first pulse injection unit including a resonance tube in outlet fluid communication with an injector nozzle, said injector nozzle having an outlet directed into the flow of the exhaust gasses;
- a second pulse injection unit located exteriorly of said nozzle and located oppositely, diametrically across the exhaust nozzle from said first pulse injection unit, said second pulse injection unit including a resonance tube in outlet fluid communication with an injector nozzle, said injector nozzle having an outlet directed into the flow of the exhaust gasses; and,
- a source of high pressure gas in fluid communication with said resonance tubes and said injector nozzles.

14. The apparatus of claim 13 wherein said source of high pressure gas includes a first source of high pressure gas in fluid communication with said resonance tubes and a second source of high pressure gas in fluid communication with said injector nozzles, said second source of high pressure gas including a switch for alternating the inlet flow of said high pressure gas between said injector nozzles.

* * * * *